(12) United States Patent
Faith et al.

(10) Patent No.: US 8,442,913 B2
(45) Date of Patent: May 14, 2013

(54) EVOLVING PAYMENT DEVICE

(75) Inventors: Patrick Faith, Pleasanton, CA (US); Theodore D. Harris, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/104,459

(22) Filed: May 10, 2011

(65) Prior Publication Data

US 2011/0320344 A1    Dec. 29, 2011

Related U.S. Application Data

(60) Provisional application No. 61/359,671, filed on Jun. 29, 2010.

(51) Int. Cl.
*G06Q 40/00* (2012.01)

(52) U.S. Cl.
USPC .......................... 705/41; 705/14.17; 235/380

(58) Field of Classification Search .............. 705/14.17, 705/41; 235/380
See application file for complete search history.

(56) References Cited

U.S. PATENT DOCUMENTS

| | | | |
|---|---|---|---|
| 3,713,235 A | 1/1973 | Roberts | |
| 5,117,355 A | 5/1992 | McCarthy | |
| 5,530,232 A | 6/1996 | Taylor | |
| 5,590,038 A * | 12/1996 | Pitroda | 705/41 |
| 6,032,136 A * | 2/2000 | Brake et al. | 705/41 |
| 6,494,367 B1 * | 12/2002 | Zacharias | 235/382 |
| 6,631,849 B2 * | 10/2003 | Blossom | 235/492 |
| 6,742,704 B2 * | 6/2004 | Fitzmaurice et al. | 235/380 |
| 6,805,287 B2 * | 10/2004 | Bishop et al. | 235/379 |
| 7,072,864 B2 * | 7/2006 | Brake et al. | 705/41 |
| 7,163,153 B2 * | 1/2007 | Blossom | 235/492 |
| 7,172,112 B2 * | 2/2007 | Bonalle et al. | 235/379 |
| 7,191,952 B2 * | 3/2007 | Blossom | 235/492 |
| 7,263,507 B1 * | 8/2007 | Brake et al. | 705/41 |
| 7,357,331 B2 * | 4/2008 | Blossom | 235/492 |
| 7,415,426 B2 * | 8/2008 | Williams et al. | 705/14.51 |
| 7,503,487 B2 * | 3/2009 | Cohagan et al. | 235/380 |
| 7,506,804 B2 * | 3/2009 | Zajkowski et al. | 235/380 |
| 7,660,763 B1 * | 2/2010 | Brake et al. | 705/38 |
| 7,707,111 B2 | 4/2010 | Brake, Jr. et al. | |
| 7,716,080 B2 | 5/2010 | Postrel | |
| 7,801,799 B1 * | 9/2010 | Brake et al. | 705/37 |
| 8,015,592 B2 * | 9/2011 | Doughty et al. | 726/2 |
| 8,082,575 B2 * | 12/2011 | Doughty et al. | 726/2 |
| 2002/0174016 A1 * | 11/2002 | Cuervo | 705/16 |
| 2003/0037000 A1 * | 2/2003 | Fieldhouse | 705/43 |

(Continued)

OTHER PUBLICATIONS

U.S. Appl. No. 61/359,671, filed Jun. 29, 2010.

*Primary Examiner* — Jagdish Patel
*Assistant Examiner* — Sara C Hamilton
(74) *Attorney, Agent, or Firm* — Kilpatrick Townsend Stockton LLP

(57) ABSTRACT

A computer apparatus is provided that comprises processor and a computer-readable medium coupled to the processor. The computer readable medium comprises code executable by the processor for implementing a method that comprises receiving a first indication at a computer apparatus that an evolving token has been used in a first transaction. Use of the evolving token in the first transaction provides a first benefit. The method further comprises that in a subsequent transaction after the first transaction, the evolving token changes so that it is associated with a payment account and the evolving token can be used to make payments.

11 Claims, 11 Drawing Sheets

U.S. PATENT DOCUMENTS

| | | | |
|---|---|---|---|
| 2003/0135462 A1* | 7/2003 | Brake et al. | 705/41 |
| 2003/0200144 A1* | 10/2003 | Antonucci et al. | 705/14 |
| 2004/0024672 A1* | 2/2004 | Brake et al. | 705/35 |
| 2005/0021400 A1* | 1/2005 | Postrel | 705/14 |
| 2005/0035192 A1* | 2/2005 | Bonalle et al. | 235/379 |
| 2005/0077350 A1* | 4/2005 | Courtion et al. | 235/380 |
| 2006/0129456 A1* | 6/2006 | Walker et al. | 705/14 |
| 2008/0319843 A1 | 12/2008 | Moser et al. | |
| 2009/0164304 A1* | 6/2009 | Otto et al. | 705/10 |
| 2010/0153194 A1* | 6/2010 | Oram | 705/14.1 |
| 2011/0035268 A1* | 2/2011 | Rossi | 705/14.17 |

* cited by examiner

EVOLVING PAYMENT DEVICE

CROSS-REFERENCES TO RELATED APPLICATIONS

This application claims benefit under 35 U.S.C. §119(e) of U.S. provisional patent application No. 61/359,671, filed on Jun. 29, 2010, the entire disclosure of which is incorporated herein by reference for all purposes.

BACKGROUND

In many parts of the world, credit cards, bank accounts, and other payment accounts are not as widely used as in the United States, which may mean that many people are not receiving the convenience and security of using payment devices associated with these accounts. Many consumers in these places may not believe that they need such accounts and/or may have never even utilized a payment device in the past. Other individuals may be weary of having to register for and/or apply for new payment accounts for a variety of reasons including that they may subject themselves to background and/or credit checks. There is therefore a need for a device, and systems and methods for utilizing such a device, that may expose these individuals to the benefits of these payment devices as well as promote the use of payment accounts by establishing familiarity through use of such a device, without requiring an initial commitment from a consumer.

Merchants are also constantly trying to find new ways to develop and grow consumer loyalty. However, this may come at an increasing cost, as the merchant may be required to give large benefits to attract business. Therefore, there is a need for a system and method that may promote and develop consumer loyalty for a merchant, but may reduce the costs to the merchant.

Embodiments of the invention address these and other problems, individually and collectively.

BRIEF SUMMARY

Embodiments of the present invention disclosed herein are directed to systems and methods for providing, implementing, and utilizing an evolving payment device. The evolving payment device and accompanying system can be implemented using one or more computer apparatus and/or database.

In one embodiment, a computer apparatus comprises a processor and a computer-readable medium coupled to the processor. The computer readable medium comprises code executable by the processor for implementing a method. The method comprises receiving a first indication at a computer apparatus that an evolving token has been used in a first transaction. The use of the evolving token in the first transaction provides a first benefit. In a subsequent transaction after the first transaction, the evolving token changes so that it is associated with a payment account and the evolving token can be used to make payments.

Preferably, the method further comprises receiving a second indication at the computer apparatus that the evolving token has been used in a second transaction. The use of the evolving token in the second transaction provides a second benefit that is different than the first benefit. Preferably, the method further comprises associating consumer information at the computer apparatus with the evolving token where the consumer conducts the first and second transactions.

In one embodiment, a computer readable medium comprises code executable by a processor for implementing a method. The method comprises receiving a first indication at a computer apparatus that an evolving token has been used in a first transaction. The use of the evolving token in the first transaction provides a first benefit. In a subsequent transaction after the first transaction, the evolving token changes so that it is associated with a payment account and the evolving token can be used to make payments.

In one embodiment, a method comprises receiving a first indication at a computer apparatus that an evolving token has been used in a first transaction. The use of the evolving token in the first transaction provides a first benefit. In a subsequent transaction after the first transaction, the evolving token changes so that it is associated with a payment account and the evolving token can be used to make payments.

In one embodiment, a computer apparatus comprises a processor and a computer-readable medium coupled to the processor. The computer readable medium comprises code executable by the processor for implementing a method. The method comprises receiving a first indication at the computer apparatus that an evolving token has been used in a first transaction. The use of the evolving token in the first transaction provides a first benefit to a consumer. The evolving token is not associated with the consumer prior to the consumer receiving the token. The method further comprises receiving a second indication at the computer apparatus that the evolving token has been used in a second transaction. The use of the evolving token in the second transaction provides a second benefit. The evolving token is associated with the consumer subsequent to the first transaction.

In one embodiment, a computer readable medium comprises code executable by a processor for implementing a method. The method comprises receiving a first indication at a computer apparatus that an evolving token has been used in a first transaction. The use of the evolving token in the first transaction provides a first benefit to a consumer. The evolving token is not associated with the consumer prior to the consumer receiving the token. The method further comprises receiving a second indication at the computer apparatus that the evolving token has been used in a second transaction. The use of the evolving token in the second transaction provides a second benefit. The evolving token is associated with the consumer subsequent to the first transaction.

In one embodiment, a method comprises receiving a first indication at a computer apparatus that an evolving token has been used in a first transaction. The use of the evolving token in the first transaction provides a first benefit to a consumer. The evolving token is not associated with the consumer prior to the consumer receiving the token. The method further comprises receiving a second indication at the computer apparatus that the evolving token has been used in a second transaction. The use of the evolving token in the second transaction provides a second benefit. The evolving token is associated with the consumer subsequent to the first transaction.

Embodiments of the invention can use a token that "evolves" over time with greater participation at a merchant (or other entity such as a payment processor or issuer). For example, in a first visit to a merchant, the merchant can give a customer a token in the form of a card. The card can act as a coupon for 10% off the next purchase at that merchant. On a second visit, the customer can be informed that he will get 20% off of the next purchase at the merchant when the token is used. On a third visit, the customer's evolving token can turn into a payment token that can be used at the merchant.

The evolving token can be used as a payment device, and also as a rewards accrual device. By having the token evolve into a payment device, the customer does not have to carry both a loyalty card at the merchant and a separate payment device such as a separate credit card. By going to the merchant multiple times, the token evolves into a device that the person can use repeatedly at the merchant.

These and other details regarding embodiments of the invention are provided below.

DETAILED DESCRIPTION

Figure 1:
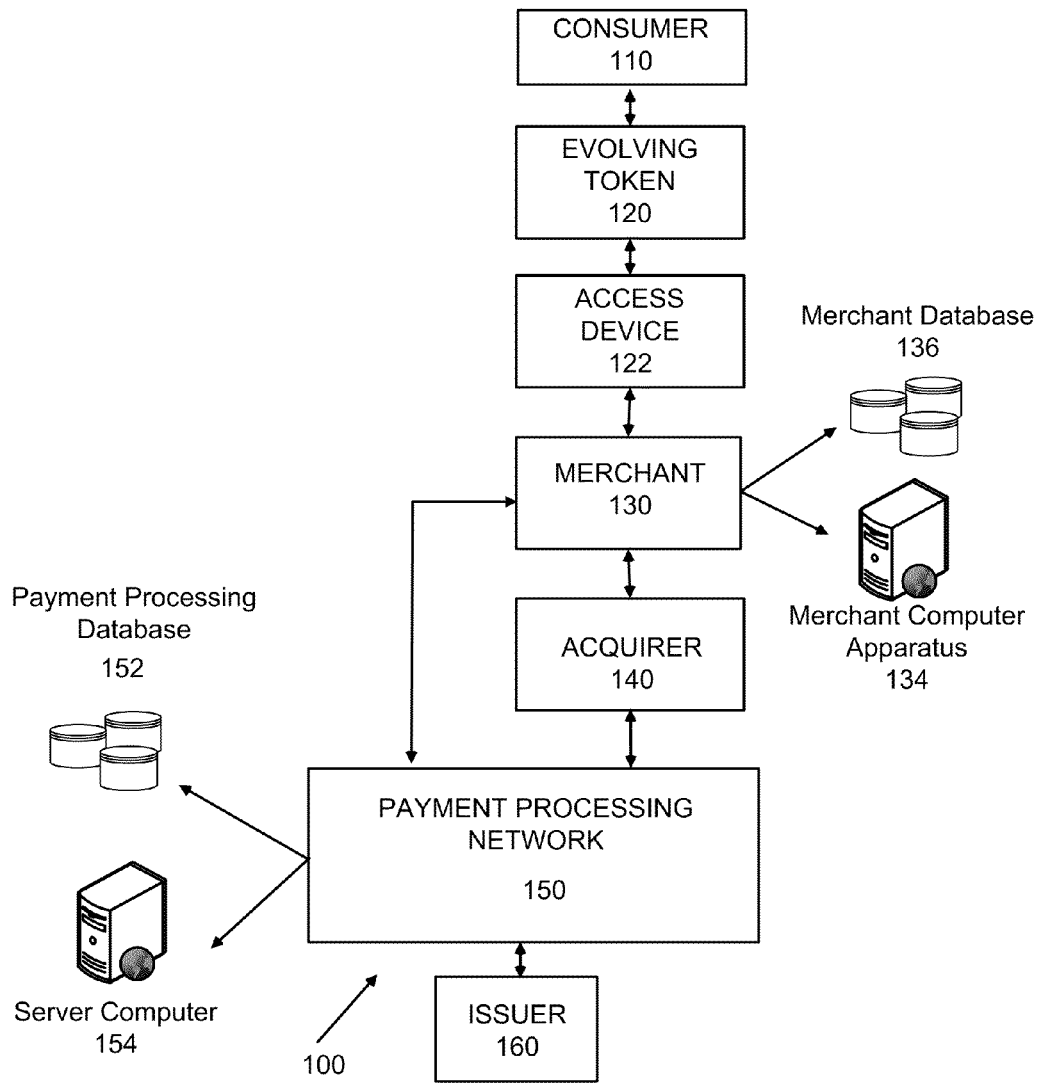
FIG. 1 shows a diagram illustrating a system that may be used in accordance with some embodiments.

Embodiments of the present invention provide systems and methods for utilizing and/or providing an evolving token that can be used to obtain benefits from a merchant and may be later used as a payment device. Such embodiments may, for example, aid in developing consumer loyalty for a merchant and may provide consumers the convenience of using a single evolving token as both a benefit accrual device and as a payment device. Furthermore, the use of the evolving token may provide information that may associate the consumer with the evolving token without requiring the consumer to provide the information.

Some terms may be described in further detail.

A "benefit," as used herein, can refer to anything of value received by the consumer from the merchant without having to give any additional value in the transaction. For instance, a benefit may comprise receiving a discount on the cost of a transaction. A benefit may also comprise receiving additional merchandise or services for the same cost of a transaction (such as a "buy one get one free"). However, the value of a benefit does not have to be monetary. For instance, a benefit may include something similar to "reward points," which a consumer may accumulate and exchange later for goods, services, or for other non-monetary benefits. A benefit may also include receiving preferential treatment, such as not having to wait in line, having access to restricted services, receiving products earlier than the general public, or receiving better or more efficient services.

A "payment device" can refer to any device, such as a portable consumer device, that may be used to pay for the cost of a transaction. Typically payment device is associated with a payment account, such as a bank account or credit card account.

In one embodiment, an evolving token is not associated with a consumer prior to a first transaction. For instance, the evolving token may be distributed by a merchant to a consumer randomly. This may permit the merchant, for example, to include the evolving token in advertisements or other solicitations. The evolving token may be associated with the merchant during a prior registration process, which will be discussed with reference to FIG. 5. During this registration, the merchant may establish benefits that a consumer may receiver by presenting the token in a transaction with the merchant, and this benefit information may be stored at the merchant or in a database connected to a payment processing network such as the VisaNet™ Integrated Payment (VIP) system.

When the consumer presents the evolving token to the merchant during the first transaction, the consumer may receive a first benefit. An indication of the first transaction may be received by a computer apparatus or server computer connected to the payment processing network. The first benefit may be provided by the merchant, the issuer, and/or the payment processing network. The benefit could be, for example, a discount on the cost of the first transaction. Some time after the first transaction, the evolving token may be associated with the consumer and/or consumer information. For example, consumer information such as the consumer's name, address, payment accounts, etc. may be associated with the evolving token and stored in a database connected to the payment processing network.

In a second transaction, the consumer may again present the evolving token to the merchant and may receive a second benefit. An indication of the second transaction may be received by a computer apparatus or server computer connected to the payment processing network. The second benefit may be based, in-part, on the use of the token in the first transaction. For example, the second benefit may be greater than the first benefit because the consumer presented the token in both the first and the second transaction (e.g. the first benefit may be 10% off the cost of the first transaction, and the second benefit may be 20% off the cost of the second transaction). In this way, the consumer may be more likely to continue to conduct business with the merchant as he continues to receive a greater benefit for subsequent transactions. Similarly, the merchant may receive the benefit of the continued business (and hence the loyalty) of the consumer, and may able to provide a lower initial benefit and still attract consumers because of the possibility of greater future benefits.

The use of the evolving token during a commercial transaction may provide information about the consumer without the need for the consumer to enter such information. For example, information related to a payment device or account that the consumer utilizes as payment in a transaction where he also uses the evolving token may be collected and stored in a database at the payment processing network. In this way, a consumer may be associated with an evolving token at the payment processing network.

At some time after the first transaction, the evolving token may change (or "evolve") into a payment device (such as by being associated with a pre-existing payment account or a new payment account). The consumer may choose to have the evolving token become a payment device, which will be discussed with reference to FIG. 4, or the merchant may have a pre-established rule as to when the evolving token will change, which will be also discussed with reference to FIG. 4. After the evolving token has changed into a payment device, it may then be used in a subsequent transaction as a payment device, to receive a benefit on the subsequent transaction, or as both a payment device and to receive a benefit. In this way, when the evolving token changes to a payment device, it may provide the consumer with the convenience of needing only to present a single token at a merchant in a transaction to both receive a benefit on the transaction and to provide payment for the transaction.

Exemplary systems and methods for providing and/or utilizing an evolving token are provided below.

I. Exemplary Systems

FIG. 1 shows a system according to an embodiment of the invention. Note that embodiments of the invention may use all or only some of the components shown in FIG. 1.

Referring to FIG. 1, a system for providing a token that evolves is illustrated 100. FIG. 1 shows a consumer 110, an evolving token 120, an access device 122, a merchant 130, an acquirer 140, a payment processing network 150, and an issuer 160. Although one consumer 110, one evolving token 120, one merchant 130, one acquirer 140, and one issuer 160 are shown, there may be any suitable number of any of these entities in a system that provides for the use of an evolving token.

The consumer 110 is in operative communication with the evolving token 120. Merchant 130 has an access device 122 for interacting with the evolving token 120 and the acquirer 140 associated with the merchant 130. Acquirer 140 is in communication with issuer 160 through payment processing network 150. In some embodiments, the merchant 130 and/or the access device 122 may also be in direct communication with the payment processing network 150.

"Consumer" 110 refers to an individual or organization such as a business that is capable of purchasing goods or services or making any suitable transaction with a merchant 130.

"Evolving token" 120 refers to something serving as an indication, proof, or expression of something else that may change (or "evolve") over time. For instance, the evolving token may initially represent a benefit or reward account that any consumer may receive when conducting a transaction with a merchant and presenting the evolving token (e.g. a coupon card). After the evolving token is used in a transaction, the evolving token may change (or "evolve") so as to provide a new benefit in a subsequent transaction based on the use of the evolving token in the previous transaction. For example, the evolving token may provide a greater benefit in a second transaction than in the first transaction. The evolving token may also change so as to be associated with or represent consumer information that becomes associated with the evolving token. The evolving token may also later be associated with a payment account and change to a payment device such that a consumer may use the evolving token to pay for a transaction.

In some embodiments, the evolving token 120 may be in the form of a portable consumer device or a virtual account number. A "portable consumer device" refers to any suitable device that allows the transaction to be conducted with merchant 130. A portable consumer device may be in any suitable form. For example, suitable portable consumer devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, 2-D barcodes, and the like. In other embodiments, the evolving token may be embodied by a virtual account or the like, and it may not be in the form of a specific physical object.

"Merchant" 130 refers to any suitable entity or entities that can conduct a transaction with the consumer 110. Merchant 130 may use any suitable method to make the transaction. For example, merchant 130 may use an e-commerce business to allow the transaction to be conducted by merchant 130 through the Internet. Other examples of merchant 130 include a department store, a gas station, a drug store, a grocery store, or other suitable business. The merchant 130 may also include a merchant computer apparatus 134 and/or merchant database 136. The merchant computer apparatus 134 and/or merchant database 136 may be used to store information related to the evolving token 120, including benefit information, and to provide the benefit to the consumer during a transaction or subsequently thereafter. The merchant computer apparatus 134 and/or merchant database 136 may also communicate with payment processing network 150.

"Access device" 122 may be any suitable device for communicating with merchant 130 and for interacting with evolving token 120. Access device 122 can be in any suitable location such as at the same location as merchant 130. Access device 122 may be in any suitable form. Some examples of access devices 122 include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. Access device 122 may use any suitable contact or contactless mode of operation to send or receive data from evolving token 120.

If access device 122 is a POS terminal, any suitable POS terminal may be used and may include a reader, a processor, and a computer-readable medium. Reader may include any suitable contact or contactless mode of operation. For example, exemplary card readers can include radio frequency (RF) antennas, optical scanners, bar code readers, magnetic stripe readers, etc. to interact with an evolving token 120.

"Acquirer" 140 refers to any suitable entity that has an account with merchant 130. In some embodiments, issuer 160 may also be acquirer 140.

"Payment processing network" 150 refers to a network of suitable entities that have information related to an account associated with evolving token 120. This information includes data associated with the account on evolving token 120 such as merchant information, benefit information, transaction information, consumer information, and other suitable information.

Payment processing network 150 may have or operate a server computer 154 and may include a payment processor database or databases 152. The payment processor database 152 may include any hardware, software, firmware, or combination of the preceding for storing and facilitating retrieval of information. Also, the payment processor database 152 may use any of a variety of data structures, arrangements, and compilations to store and facilitate retrieval of information. Moreover, the payment processor database may comprise an evolving token database 210 and a payment device database 220, which are discussed in more detail with reference to FIG. 2. In some embodiments, the evolving token database 210 may be the same as the existing payment database 220.

The server computer 154, which will be discussed in more detail with reference to FIG. 2(a), may be coupled to the payment processing database 152 and may include any hardware, software, other logic, or combination of the preceding for providing the desired functionality. Server computer 154 may use any of a variety of computing structures, arrangements, and compilations. For instance, server computer 154 may comprise a processor and a computer-readable medium coupled to the processor, the computer readable medium comprising code executable by the processor for implementing any of the functionality associated with providing for an evolving token. The server computer 154 may be a powerful computer or cluster of computers. For example, the server computer 154 can be a large mainframe, a minicomputer cluster, or a group of servers functioning as a unit. In one example, the server computer 154 may be a database server coupled to a Web server.

Payment processing network 150 may also include data processing subsystems, networks, and operations used to support and deliver authorization services, exception file services, and clearing and settlement services. An exemplary payment processing network 150 may include VisaNet™. Networks that include VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. Payment processing network 150 may use any suitable wired or wireless network, including the Internet.

"Issuer" 160 refers to any suitable entity that may open and maintain an account associated with a payment device for consumer 110. Some examples of issuers may be a bank, a business entity such as a retail store, or a governmental entity. In many cases, issuer 160 may also issue a payment device associated with the account to consumer 110.

Figure 2:
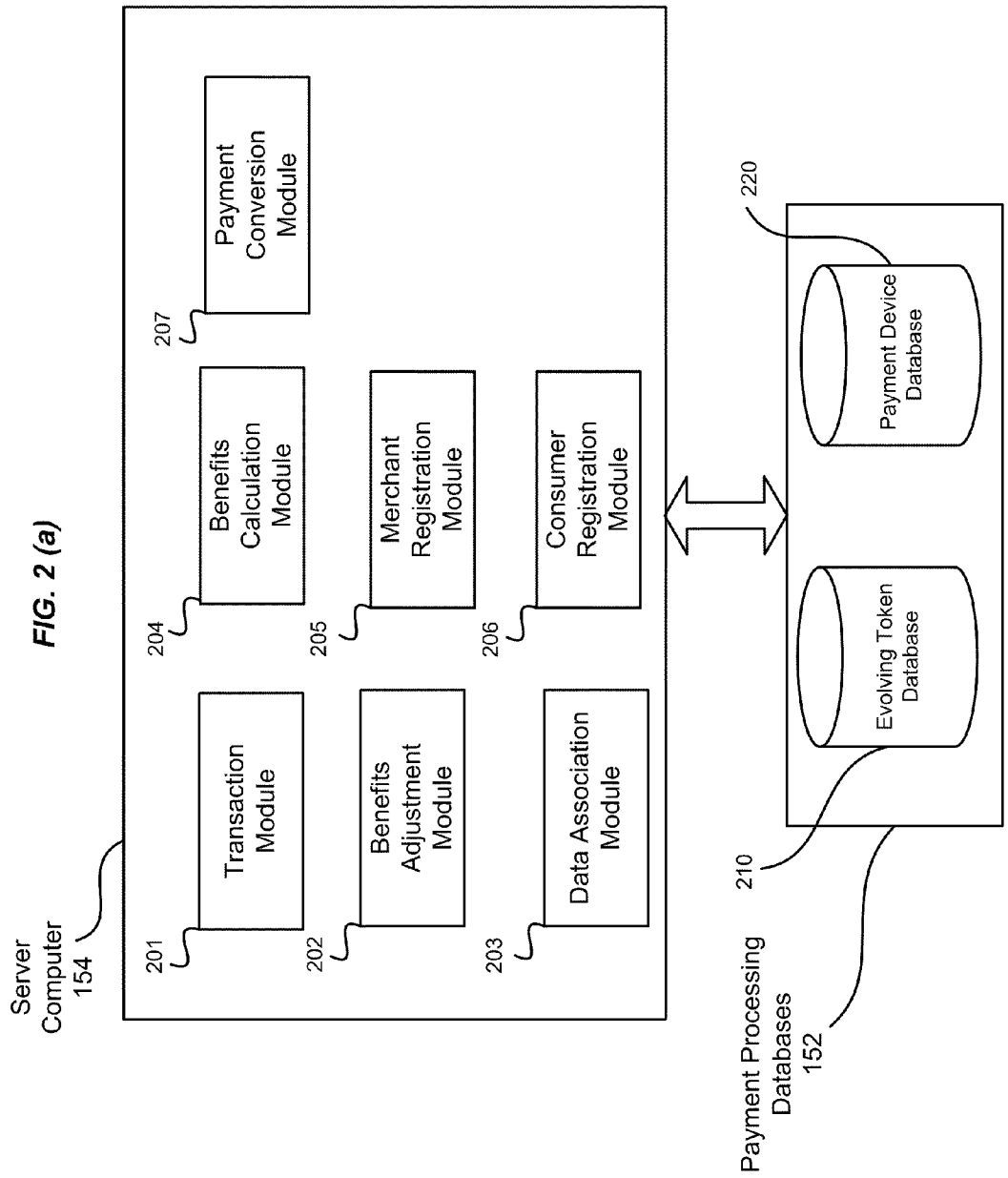
FIGS. 2(a) and (b) show diagrams illustrating in more detail components that may comprise a part of the system in FIG. 1.
Figure 2:
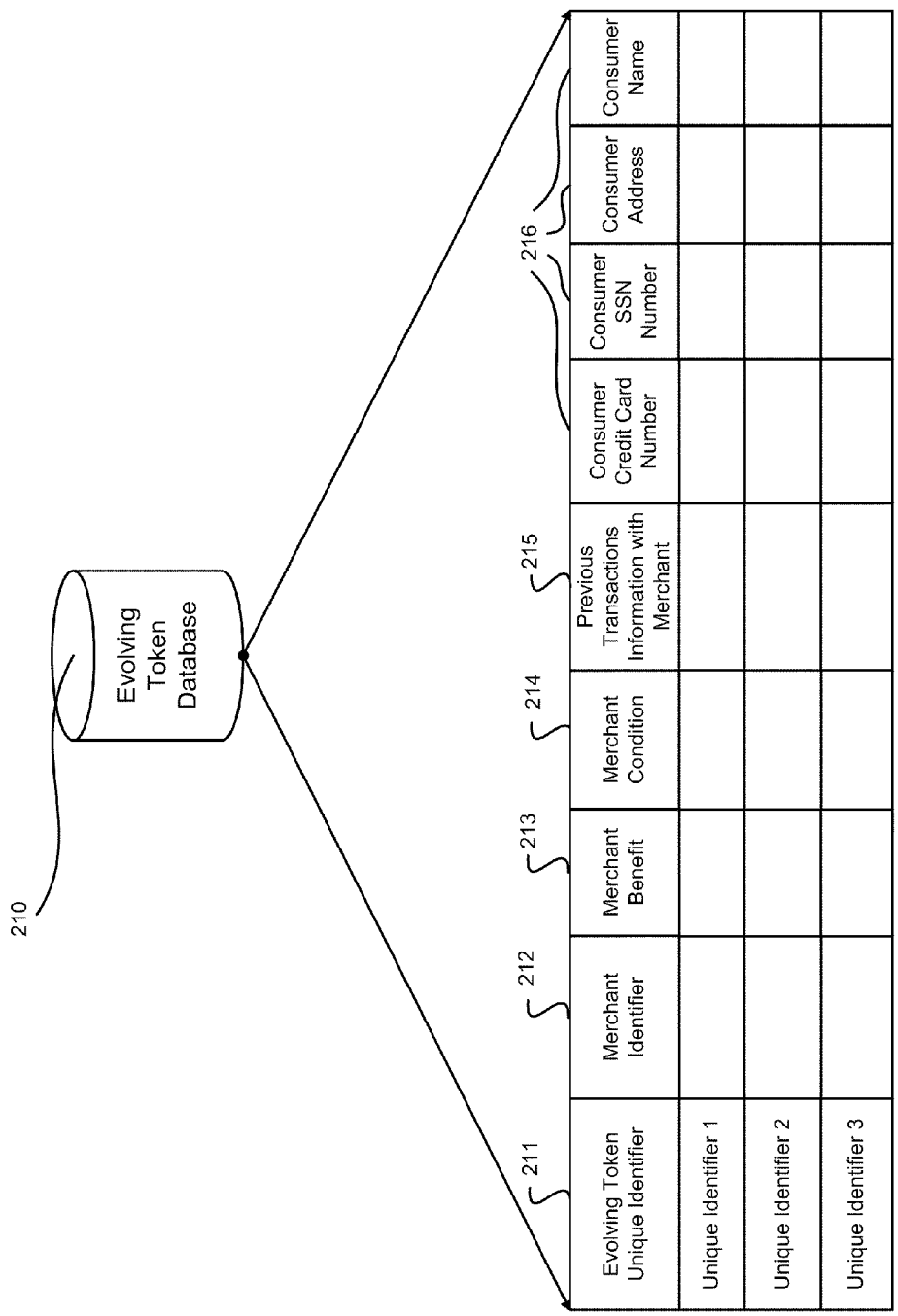

FIG. 2 comprises two diagrams illustrating components of a server computer and database for providing an evolving token. FIG. 2(a) provides a more detail illustration of an exemplary embodiment of a system for implementing some of the functionality for providing an evolving token, and specifically a server computer 154 that may perform functions in accordance with aspects of the present invention. This server computer may for example, through the use of software instructions and/or hardware configurations, perform some or all of the functions and steps described at least with reference to FIG. 3. It should be noted that although FIG. 2 illustrates all of the modules located on a single device, the disclosure is not meant to be so limited. A system for implementing functionality related to providing an evolving token may have additional components or less then all of these components. Additionally, some modules could be located on other devices such as a remote server or other local devices that are functionally connected to the server computer component(s).

Figure 3:
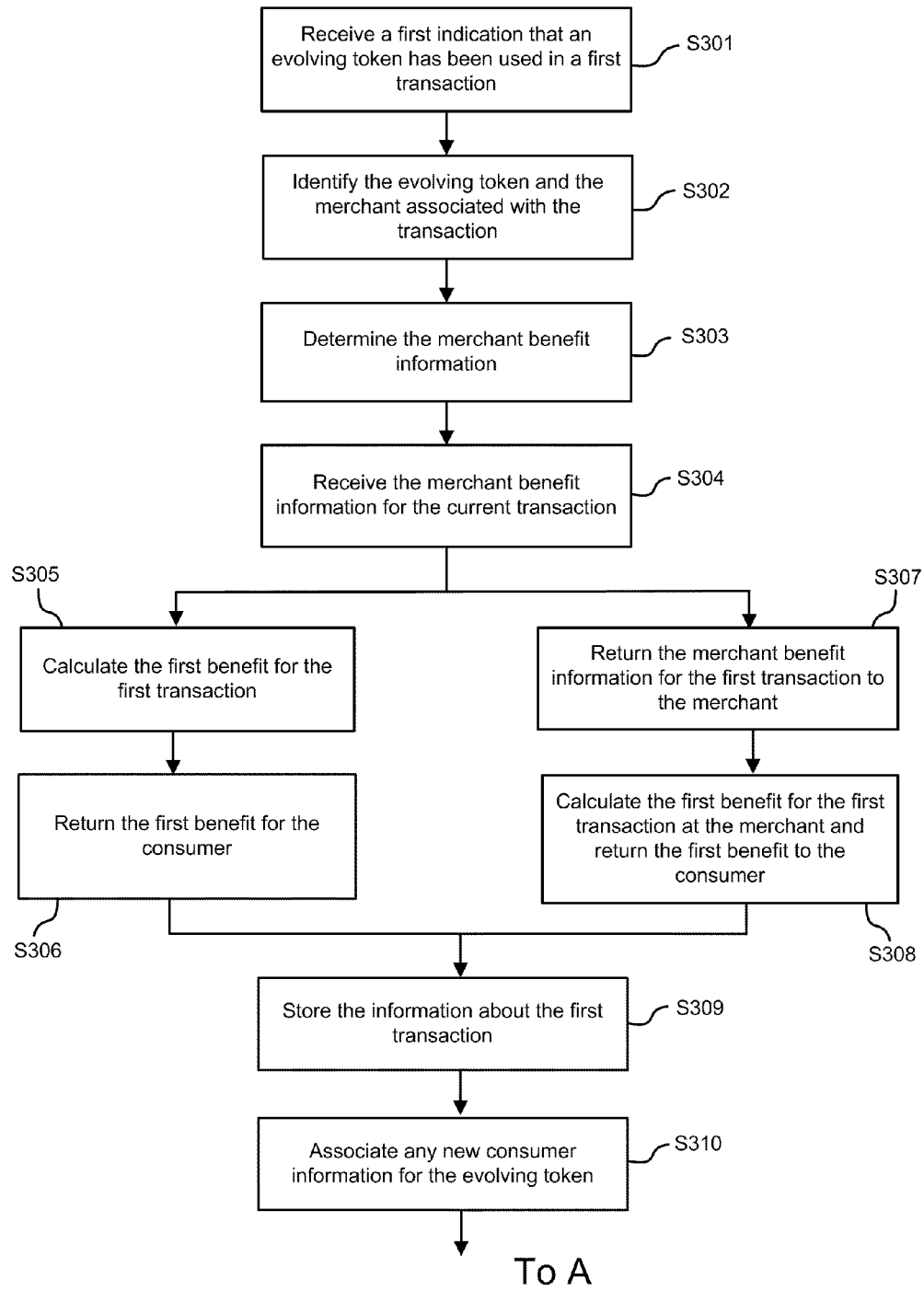
FIG. 3 shows a flowchart illustrating steps that the system may perform in providing an evolving token.
Figure 3:
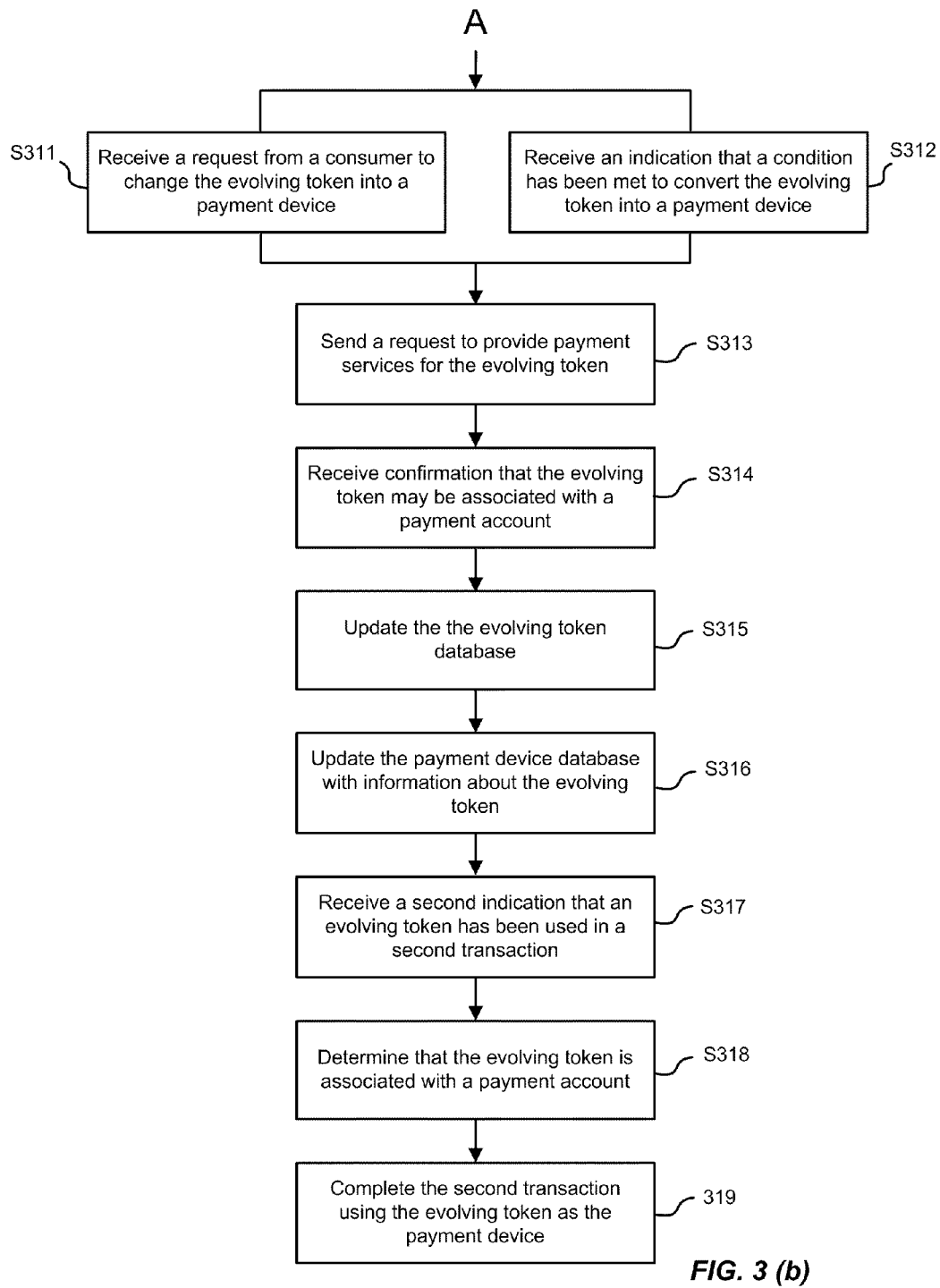

The Transaction Module 201 may be configured or programmed to perform some or all steps associated with the initiation of the process of providing an evolving token described in FIG. 3. In this regard, the module may be configured or programmed to receive an indication that a token has been used in a transaction. The Transaction Module 201 may index the evolving token database 210 for information related to the evolving token 120 that was used in the transaction and may also determine the merchant identifier that is associated with the transaction. The Transaction Module 201 may also provide the retrieved information related to the evolving token to the appropriate modules for further processing.

The Benefits Adjustment Module 202 may be configured or programmed to perform some or all of the steps associated with determining the benefit a consumer may receive in the current transaction based on the merchant condition (e.g. a rule), previous transaction data, current transaction data, and/or any other information or factor that may be appropriate. The module may also update any of this information for the evolving token in the evolving token database 210. In this regard, the module may be programmed or configured to receive information from the Transaction Module 201, the Benefits Calculation Module 204, and/or any other module that has information regarding a current transaction. The Benefits Adjustment Module 202 may also query the evolving token database 210 for information, such as merchant condition information (which may be information that describes the condition or rule that may determine the benefit that will be provided by a merchant for this particular evolving token based on the current and/or previous transactions), and information on previous transactions. The Benefits Adjustment Module 202 may then determine the merchant benefit 213 (i.e. the benefit that may be received for this transaction, such as "20% off of the total cost of the transaction") and send this information to the Benefits Calculation Module 204 and/or store it in the evolving token database. The module may also update information regarding past transactions and/or benefits received by the consumer.

The Data Association Module 203 may be configured or programmed to perform some or all of the steps associated with relating consumer information to a particular evolving token. In this regard, the module may be configured or programmed to receive information from the Transaction Module 201, the Consumer Registration Module 206, and/or any other module that may obtain information that is related to an evolving token. The module may also store any of the received data related to the evolving token 120 in the evolving token database 210. The Data Association Module 203 may also query the payment device database 220 with information related to an evolving token to obtain additional information to associate with the evolving token. For instance, if a payment device such as a credit card is used in a transaction with the evolving token, the Data Association Module 203 may receive the credit card number from the Transaction Module 201, query the payment device database 220 using the credit card number, receive consumer information associated with the credit card number (such as consumer name, address, etc.), and store this information in the evolving token database 210.

The Benefits Calculation Module 204 may be configured or programmed to perform some or all of the steps associated with calculating the benefit that a consumer is to receive for the current transaction. In this regard, the module may be programmed or configured to receive information from the Transaction Module 201, the Benefits Adjustment Module 202, and/or to query the evolving token database 210 for information. The information used by this module may include the merchant benefit information 213 determined by the Benefits Adjustment Module 202 for the evolving token for the current transaction (which may either be retrieved from the database or received from the Benefits Adjustment Module 202). The Benefit Calculation Module 204 may return this information to the merchant or it may calculate the benefit that the consumer may receive for the current transaction. For instance, if the current merchant benefit information 213 is for a 20% discount on the cost of the current transaction, the Benefits Calculation Module 204 may either return to the merchant this information (i.e. 20% discount) or it may apply the benefit to the current transaction cost and return only the final cost of the transaction. The Benefits Calculation Module 204 may send any transaction or benefits information to the other modules including the Benefits Adjustment Module 202.

The Merchant Registration Module 205 may be configured or programmed to perform some or all of the steps associated with establishing merchant benefits and merchant conditions (e.g. rules) for an evolving token. In this regard, the Merchant Registration Module 205 may be configured or programmed to perform the steps that are discussed in more detail with reference to FIG. 5. The Merchant Registration Module 205 may also provide an interface, such as a website, for the merchant to enter relevant information for an evolving token. The module may also provide the merchant with the ability to request evolving tokens (such as for distribution to customers), to establish a relationship with an issuer (e.g. for eventual conversion to a payment device), and/or to update any of the merchant information stored in the evolving token database 210.

The Consumer Registration Module 206 may be configured or programmed to perform some or all of the steps associated with registering a consumer with an evolving token. In this regard, the module may request consumer information or provide an interface (such as a website) for the consumer to enter such information. The module may also receive and/or store any of the received consumer information associated with an evolving token in the evolving token database 210.

The Payment Conversion Module 207 may be configured or programmed to perform some or all of the steps associated with changing the evolving token into a payment device. In this regard, the module may be programmed or configured to receive a request from the consumer to change the evolving token into a payment device by, for example, associating the evolving token with a preexisting payment account (e.g. a credit card or bank account). The Payment Conversion Module 207 may also interface with an issuer to directly request, or permit the consumer to request, a new payment account to be associated with the evolving token. In some embodiments, the module may receive notice that a condition set by the merchant or an issuer has been met (e.g. based on the use of the evolving token) and thereby the evolving token should be changed to a payment device. The module may also be programmed or configured to receive from the issuer confirmation that an account is or may be associated with the evolving token. The module may update both the evolving token database 210 and the payment device database 220 with the information about the evolving token.

The Payment Processing Database 152 may include one or more databases including an evolving token database 210, which will be described in more detail with reference to FIG. 2(b), and a payment device database 220. In some embodiments, the evolving token database 210 and the payment device database 220 may comprise the same database. Each of these databases may comprise more than one database, and may be located in the same location or at different locations. The payment device database 220 contains information associating payment accounts with tokens, which may be embodied, for example, in a portable consumer device.

FIG. 2(b) provides a more detailed illustration of an exemplary embodiment of an evolving token database 210. As noted above, the evolving token database 210 may comprise more than one database, and the databases may be in the same location or may be remotely located. Moreover, the evolving token database 210 may comprise a single database or a single set of databases with the payment device database 220. The evolving token database 210 may be configured to contain some or all of the information associated with an evolving token. Some possible categories of information that may be stored in the database will be discussed below.

The evolving token database 210 may include an evolving token unique identifier 211. This may be similar to an account number, and may be unique to a single evolving token. In some embodiments, a group of tokens may share the same identification number. Providing a unique identifier 211 may permit each token to ultimately be associated with a particular consumer. Moreover, the token may be associated with one, or more than one, merchant. Furthermore, by having a unique identifier, it may be possible to track the number and/or type of transactions that the evolving token has been used in, and may thereby permit an adjustment of the merchant benefits provided in subsequent transactions. In some embodiments, the unique identifier may comprise an identifier corresponding to a preexisting account of a user, such as an identifier utilized for a social networking website.

The merchant identifier 212 may by a unique identifier of a merchant or may identify a group of merchants that may have common element, such as a common merchant benefit, merchant condition, or transaction data (e.g. if a group of merchants will provide increasing benefits based on transactions that occur at any of the other merchants). The merchant identifier 212 may permit multiple merchants to provide different benefits for use of the same evolving token (e.g. the evolving token may serve as a universal coupon card). The evolving token database 210 may therefore have multiple merchant identifiers 212 associated with a single evolving token.

The merchant benefit 213 may by the benefit that a merchant will provide for the current transaction or the next transaction. For instance, the merchant benefit 213 may be a discount off of the total cost of the current or the next transaction. The merchant benefit 213 may be directly set by the merchant or it may be calculated based on previous transactions using the evolving token and/or the merchant condition 214. As noted above, the merchant benefit 213 may be unique to each merchant or may be associated with a group of merchants. Because the merchant benefit 213 may be based on previous transactions using the evolving token, the merchant may provide different benefits for different evolving tokens.

The merchant condition 214 may be the condition or rule that a merchant has established as to how benefits for a transaction may be determined. For instance, the merchant condition 214 may define benefits for subsequent transactions based on information about previous transactions. Examples may include providing an increased benefit for each transaction that a consumer uses the evolving token at the merchant (e.g. for the first transaction the benefit is 10% off the transaction cost, for the second transaction the benefit is 20% off the cost of the transaction, and so on). The conditions may also consider information such as the time between transactions, the time of the transaction (e.g. a merchant may provide a greater benefit around the holidays or for consumers who purchase during the work week), the cost of a previous transaction (e.g. if in a previous transaction, the consumer spent $100, they may get an additional 10% discount on the next transaction), etc. Any information may be used as part of the merchant condition 214 to determine the benefit of the current or future transactions.

Previous transaction information for merchant 215 may include any and all information pertaining to previous transactions conducted using an evolving token at a particular merchant or merchants. Some examples may include the number of previous transactions, the time of those transactions, the amount of previous transactions, and the benefit received in previous transactions. This is not an exhaustive list, and as mentioned above, any information may be utilized by the merchant in determining the benefit to provide to a consumer in a current or subsequent transaction.

Information may also be stored in the evolving token database 210 related to a consumer that is associated with the evolving token. This consumer information 216 may include any information that is determined to be associated with the consumer, including information obtained by consumer input (such as during a consumer registration process) or determined and associated automatically based on transaction information (such as an associated payment account). The consumer information 216 may also include information on the consumer's behavior, such as items purchased, the time of purchasing, the type of merchants most frequented, the type of transactions (such as online purchasing), and/or any other information that may be obtained about the consumer from the use of the evolving token. Moreover, it may include information that may be used as a security feature for the evolving token, such as biological information about the consumer, such as information about a consumer's face or his fingerprints. Other examples of information that may be associated with an evolving token include consumer name, a credit card number, a checking account number, a savings account number, a social security number, a passport identification number, a drivers license number, an address, a social network identifier, email address, a phone number, and an age.

It would be understood by one of ordinary skill in the art that while the exemplary embodiments of the system discussed above describe the software and/or hardware modules for implementing the evolving token with reference to the server computer 154 and the payment processing database 152 at the payment processing network 150, in alternative embodiments any or all of these modules and/or the information stored in the payment processing database 152 may be located in any suitable location. For instance, embodiments may locate some or all of the modules at the merchant 130 and may utilize the merchant computer apparatus 134 and/or the merchant database 136. In such embodiments, the benefit received by the consumer for a transaction may be determined at the merchant 130 without the requirement of utilizing the payment processing network. Other embodiments may locate the modules, the information, and/or perform steps as described above at other locations such as at the access device 122, the acquirer 140, the issuer 160, or any combination of the above.

It would also be understood by one of ordinary skill in the art that although the benefits and benefit conditions were described with reference to a merchant, the system and methods are equally applicable if the benefits are provided by another party such as the issuer 160. For instance, the issuer may provide benefits based on the use of the evolving token, and thereby promote the continued use of the evolving token and the loyalty of the customer to the evolving token itself, which may facilitate the transition of the evolving token into a payment device. In such embodiments, the issuer may establish the benefit information. The system, as well as the relevant modules, may perform similar functions, and may simply substitute the issuer as the benefit provider. In some embodiments, the merchant and the issuer may jointly provide benefits and establish conditions for the evolving token.

II. Exemplary Methods

Methods according to embodiments of the invention can be described with respect to FIGS. 3-6.

A. Exemplary System Method

FIG. 3 illustrates an example of how the exemplary system described above may provide for the use of an evolving token. While the below method will be described with respect to the use of the payment processing network 150, the payment processing database 152, and the server computer 154, as noted above, the components and/or the performance of any steps described below may be located anywhere in the system.

With reference to FIG. 3(a), the exemplary system receives a first indication that an evolving token has been used in a first transaction at S301. For instance, this indication may be received by the Transaction Module 201, which may be located on server computer 154. Other embodiments may, for example, locate the Transaction Module 201 at the merchant computer apparatus 134. The indication of the transaction may also include information such as an identifier of the evolving token used (e.g. the evolving token identification number 211), the merchant identifier 212, and/or transaction specific information such as the total cost of the transaction, the type of transaction, and any other information that may be included by the merchant and/or the consumer. The indication may be in the form of a message, and may include one or more data packets. However, any manner of indicating a first transaction may be used.

At step S302, the system identifies the evolving token identifier 211 and the merchant identifier 212 information associated with the transaction. This may be performed by the Transaction Module 201 and may be done using any known method, including parsing the information that is included in the transaction indication. As described above, an evolving token may be associated with multiple merchants, each of whom may offer different benefits and may have different data related to previous transactions for the evolving token. The evolving token identifier 211 and the merchant identifier 212 information may thereby be utilized to locate additional information within the evolving token database 210 to determine the benefit to provide for the current transaction. For instance, the evolving token database 210 may be first indexed according to the evolving token identifier 211. Then, information that is related to the evolving token for the merchant involved in the current transaction may then be identified by using the merchant identifier 212. However, as would be understood by one of ordinary skill in the art, any manner of determining the benefit information for the evolving token and the merchant involved in the current transaction may be used.

The system may then determine the merchant benefit information 213 for this particular transaction at step S303. This may be done by the Benefits Adjustment Module 202, which may utilize information about the current transaction received from the merchant or from another source, as well as information stored in the evolving token database 210, such as the merchant condition 214 and previous transaction information for the merchant 215, to determine the merchant benefit information 213. Additional information may also be used. The merchant benefit information 213 may be sent to the Benefits Calculation Module 204 and/or stored in the evolving token database 210. The merchant benefit information 213 may be used to determine the first benefit received by the consumer, and may, for example, be a fixed benefit (e.g. $5.00 off) or may depend on the current transaction information (e.g. 20% off of the total cost). Other types of merchant benefit information 213 may also be determined.

The merchant benefit information 213 for the current transaction may then be received by the Benefits Calculation Module 204 at step S304. This may include querying the evolving token database 210 or receiving the information from the Benefits Adjustment Module 202. The Benefits Calculation Module 204 may provide the merchant benefit information 213 to the merchant, whereby the merchant then applies the merchant benefit information 213 to the current transaction so the consumer receives the benefit (proceed to S307) or the module may calculate the benefit for this transaction and provide the consumer the benefit (proceed to S305).

At step S305, the first benefit is calculated by the Benefits Calculation Module 204 based on the merchant benefit information 213 for the current transaction. In some instances, the first benefit may not be dependent on the current transaction information (e.g. the consumer receives $5.00 off). However, in other instances, a calculation using the current transaction information may be required (e.g. if the consumer is to receive a 20% discount on the current transaction cost). At step 305, the first benefit may be returned to the consumer. The benefit may be received from any one of, or some combination of, entities within the current system. In the example where the consumer receives a monetary discount on the current transaction, the benefit may be applied by the merchant (e.g. the merchant receives the benefit calculation from Data Calculation Module 204 and applies the benefit at the POS), or may result from the payment processing network (e.g., by transmitting the reduced transaction cost to the merchant), and/or may involve the issuer giving a statement credit on the consumer's monthly billing statement. However, any manner of providing the benefit to the consumer may be used.

In some embodiments, instead of the calculation of the first benefit occurring at a Benefits Calculation Module 204 located remotely from the merchant, at step 307 the merchant benefit information 213 may be returned to the merchant. At step S308, the calculation of the first benefit may occur at the merchant, such as at the POS terminal or at the merchant computer apparatus 134, and the first benefit may then be returned to the consumer.

At step S309, information related to the first transaction may be stored for use in determining the benefit in a subsequent transaction. As noted above, the merchant condition 214 may utilize previous transaction information, such as the number of transactions, the frequency of transactions, the total cost of transactions, etc. in determining benefits for a current transaction. This information may be stored by any of the modules described above, including the Transaction Module 201, the Benefits Adjustment Module 202, and/or Benefits Calculation Module 204. Moreover, this information may be stored in any appropriate location including the evolving token database 210, the merchant database 136, and/or on the evolving token 120.

At step S310, any new data that may be related to the evolving token may be stored in a database so as to associate the data with the evolving token. This process may be performed by the Data Association Module 203. For instance, if a consumer uses a payment device in the same transaction as the evolving token, the information on the payment account may be associated with the evolving token and stored in the evolving token database 210. Moreover, this information may be used to index the payment device database 220, and return additional information about the consumer using the evolving token in the transaction, which information may also be stored in the evolving token database 210. In this manner, a consumer may become associated with an evolving token without having to provide such information. This may make converting the evolving token into a payment device faster and more convenient for the consumer. Any other information related to the transaction or the consumer may also be stored and associated with the evolving token at step S310.

Continuing to FIG. 3(b), steps S311 and S312 are examples of triggering events that may begin the change of the evolving token from a coupon or rewards type device into a payment device. At step S311, the consumer may request (i.e. choose) that the evolving token change into a payment device. This may be facilitated by the Payment Conversion Module 207 and/or the Consumer Registration Module 206. In some embodiments, and as indicated at step S312, the request to convert the evolving token into a payment device may be initiated by a merchant or a merchant condition. For instance, the merchant condition information 214 may indicate that after a certain number of transactions, the evolving token should be converted into a payment device (this may particularly be the case if the issuer 160 is providing a benefit to the consumer or has an agreement with the merchant). In either S311 or S312, the consumer may provide information to the Payment Conversion Module 207 required to facilitate the change into a payment device, including any of the following: the consumer's name, address, social security number, pre-existing payment account information, etc. In some embodiments, the information required to change the evolving token into a payment device may already be associated with the evolving token either because the consumer previously provided it in a registration process of the evolving token (e.g. by utilizing the Consumer Registration Module 206), the information was automatically associated with the evolving token by the Data Association Module 203 during previous transactions, or some combination thereof.

At step S313, a request is sent to an issuer 160 to change the evolving token into a payment device. The request may be sent by the Payment Conversion Module 207 to an issuer 160 or other entity, and may include any or all information that has been associated with the evolving token, including consumer information as well as previous transaction information. To convert the evolving token into a payment account typically requires an issuer 160 to associate that evolving token with a payment account, such as a credit card account or bank account. The issuer 160 may require the additional information collected in steps S311 and S312 to perform a credit check or other background research on the individual before changing the evolving token into a payment device. In some embodiments, if sufficient information is already be associated with an evolving token prior to the request to change it into a payment device, the issuer 160 may pre-approve a consumer associated with the evolving token for a payment account. At step S315, if the issuer 160 approves of the consumer and the evolving token is converted into a payment device, a confirmation and/or other information (such as payment account information) may be received by the Payment Conversion Module 207.

At step S315, any information stored at the evolving database 210 may be updated by the Payment Conversion Module 207 to reflect that the evolving token may now be used as a payment device. This may include associating any new information about the consumer in the evolving token database 210, as well as the new payment account information associated with the evolving token. At step S316, the Payment Conversion Module 207 may also update the payment device database 220 with information that reflects that the evolving token may now be used as a payment device, including adding the associated payment account information. In some embodiments, the evolving token database 210 and the payment device database 220 may be the same.

After the evolving token has been successfully converted into a payment device, the evolving token may be presented in a subsequent transaction by a consumer to receive a benefit, to pay for the transaction, or both to receive a benefit and to pay for the transaction. At step S317, the Transaction Module 201 may receive a second indication that a second transaction involving the evolving token has occurred. The second indication may contain similar information as the first indication in S301.

At step S318, the Transaction Module 201 may determine that the evolving token is associated with a payment account. For example, the evolving token database 210 may include a flag or other indicator that the evolving token has changed into a payment device. In such a case, the consumer may be provided with an option to as to whether to use the evolving token as a payment device, a coupon or benefit accrual device, or both. Other embodiments may automatically treat the evolving token as a payment device and/or benefit or reward accrual device when presented by a consumer in a transaction. To provide a benefit for the transaction based on the use of the evolving token (e.g. as a coupon or accrual device), the system may perform steps similar to those described in S302-310. If the evolving token is to be used as a payment device, then the payment processing system may conduct the transaction as it would for any other payment device, such as a credit card.

In this manner, the evolving token may now be used to both receive a benefit and provide payment for a transaction, resulting in the consumer needing to only present a single token or device to complete the transaction and receive a benefit.

B. Exemplary Method Including Consumer Actions

Figure 4:
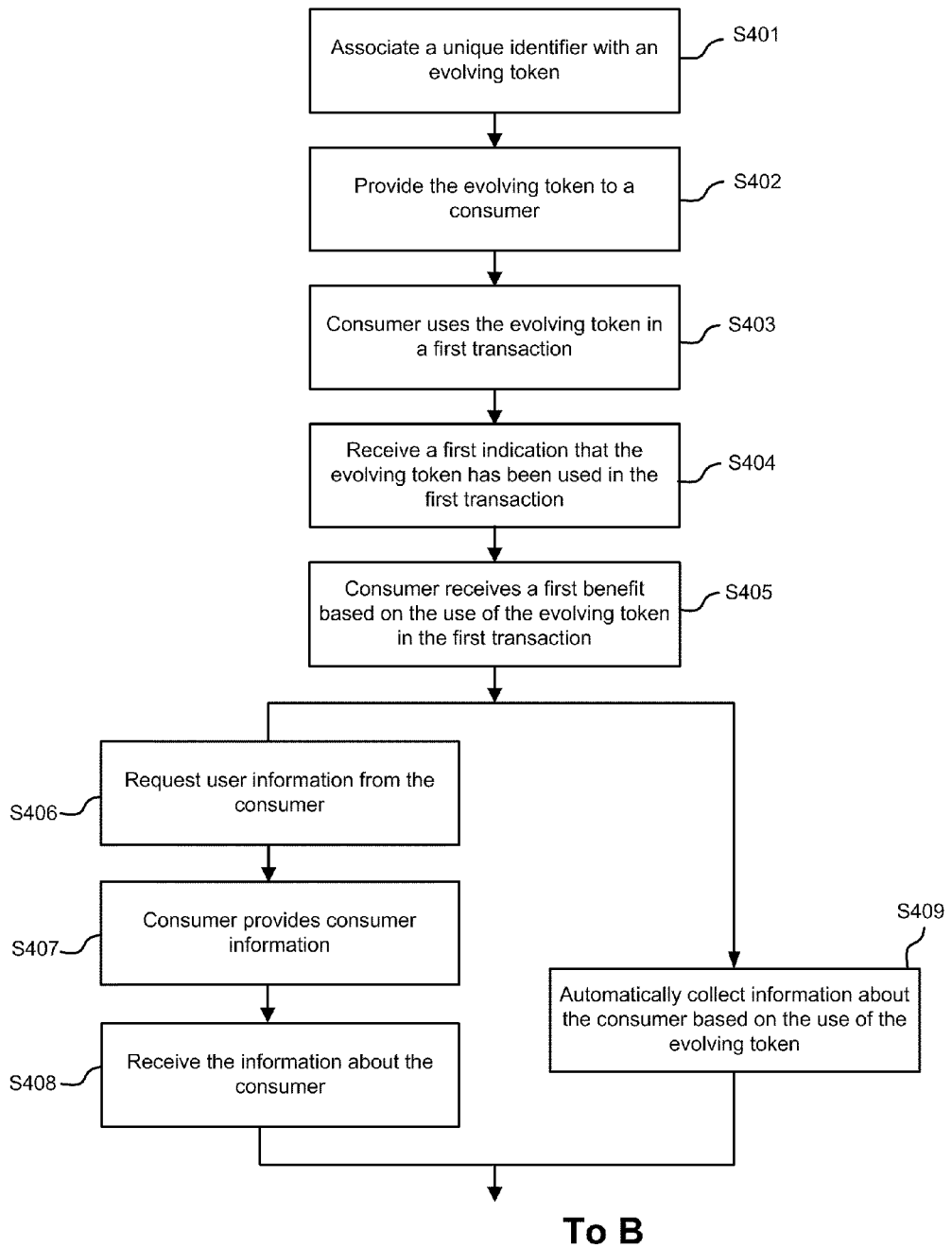
FIG. 4 shows a flowchart illustrating steps that may be involved in providing and using an evolving token.
Figure 4:
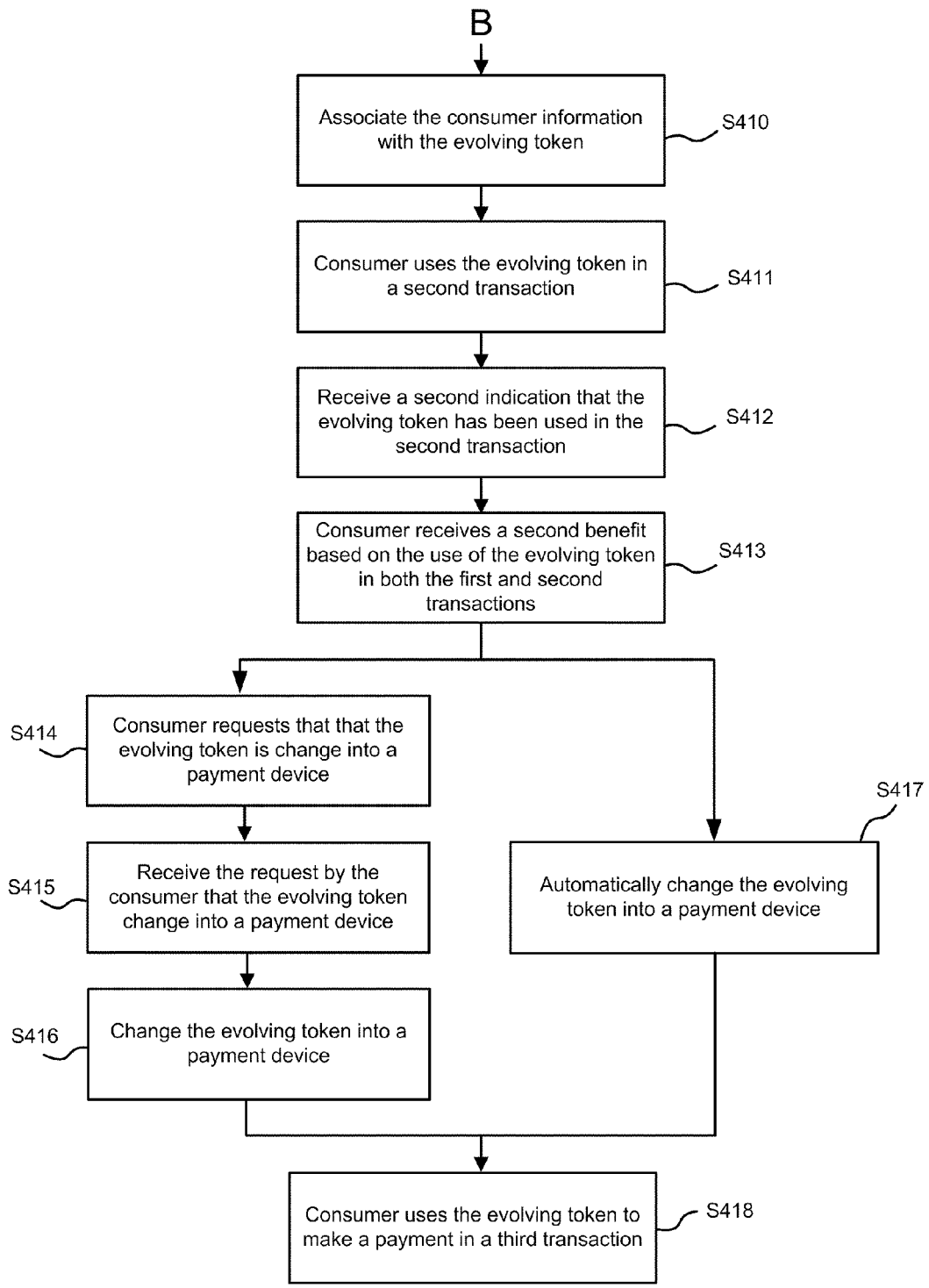

FIG. 4 illustrates an example of an exemplary process that describes the use of an evolving token. With reference to FIG. 4(a), at step S401 a unique identifier may be associated with the evolving token (e.g. evolving token unique identifier 211). This may be done at the payment processing network 150 (e.g. at the evolving token database 210) or may be done in any other suitable location. For instance, a merchant may associate a unique identifier with an evolving token at the merchant database 136. As detailed above, assigning a unique identifier to the evolving token may allow for merchants to provide different benefits to different consumers. It may also facilitate the evolving token being associated with the consumer and the eventual change of the evolving token into a payment device.

At step S402, the evolving token may be provided to a consumer. This may be done by any suitable means and by any entity, including the merchant, the issuer, or a third party. Furthermore, because the evolving token is not associated with a particular consumer, the distribution may be done randomly. For instance, the evolving token may be included in an advertisement such as a magazine, or may be given to a consumer at a POS. The fact that evolving token is not associated with a particular consumer provides this increased flexibility in distribution, and may also increase the likelihood that a consumer will accept the evolving token and use it in subsequent transactions, because it does not require any input or information from the consumer. Although the evolving token may be provided by a merchant or an issuer, these entities may have a predefined relationship for providing benefits to the consumer. For instance, the cost of the benefit provided may be shared between the entities. The merchant receives the benefit of increased loyalty of the consumer and an increase in the number of transactions, while the issuer may receive the benefit of a future account holder when the evolving token changes into a payment device.

At step S403, the consumer may present or use the evolving token to the merchant in a first transaction. As described above, the evolving token may be in any suitable form. The merchant may use access device 122, which may be any suitable device for communicating with merchant 130 and for interacting with evolving token 120. The use of the evolving token in the first transaction may generate an indication that may be received by the payment processing network. In some embodiments, the indication may be received at any location in which information may be used to determine the benefit for the use of the evolving token, such as at the merchant computer apparatus 134. In some embodiments, when the evolving token is functioning as a benefit or reward accrual device, the merchant may communicate directly with the payment processing network 150 and/or the server computer 154 and payment processing database 152. At step S404, the server computer 154 (or any other suitable computer apparatus at any location) may receive the first indication of the transaction and perform the steps necessary to ascertain the first benefit for the consumer that is using the evolving token with this particular merchant. An exemplary process for determining the benefit for the current transaction was described in detail with reference to FIG. 3.

At step S405, the consumer may receive a first benefit based on the use of the evolving token. As described above, the benefit may be based on the previous use of the evolving token, information about the current transaction, or any other appropriate factor. An exemplary process for determining the benefit, as well as applying the benefit for the consumer, was described in detail with reference to FIG. 3. In addition, if this is the first time the consumer has used the evolving token, the evolving token may not yet be associated with the consumer. That is, there may not be any consumer information about the consumer that is associated with the evolving token.

Although as illustrated, FIG. 4 may imply that steps S406-S408 and S409 are mutually exclusive, however, in some embodiments this is not the case. Indeed, steps S406-S408 and step S409 may both be performed for a single transaction, only one or the other may be performed, or none of these steps may be performed for a given transaction. Steps S406-408 may occur during, or subsequent to, a first transaction. For instance, the consumer may receive a request for information from a merchant 130 or from the payment processing network 150 after the consumer presents the evolving token but before the transaction is complete. This may occur at a POS terminal if the transaction occurs at a merchant location such as a department store, or it may be presented as part of a website (or pop-up window) if in an e-commerce environment. In some embodiments, the consumer may receive a request subsequent to the transaction to provide additional information. At step S407, the consumer may provide consumer information 216 that may then be associated with the evolving token. Note also that the consumer may not be required to provide such information. For instance, the system or process may not request such information or the consumer may decline to provide any information. In that case, the process may skip step S408. Otherwise, at step S408 the consumer information may be received, for example, by the Consumer Registration Module 206.

Step S409 may be performed without any consumer input or requiring the consumer to consent to providing the information. Moreover, the consumer does not even need to know that the information was collected. When the indication of the first transaction is received (such as at the payment processing network 150, the server computer 154, the merchant computer apparatus 134, or any other suitable computer apparatus and as described with reference to FIG. 3), additional information may also be included. In some embodiments, the additional information may be received after the first transaction is complete. The additional information may include information such as a payment account that the consumer used to pay for the transaction, the type of transaction, the type of goods purchased, or any other relevant information. This may be in addition to transaction specific information that may be used to determine the benefit to be provided for the current transaction or subsequent transactions. This data may be automatically collected by the system 100 and automatically associated with the evolving token in a storage device or database, such as the evolving token database 210.

With reference to FIG. 4(b), the exemplary process of using an evolving token is continued. At step S410, consumer information that may have been collected in steps S406-S409 may be associated with the evolving token, for instance, at the evolving token database 210. Associating consumer data with the evolving token may provide merchants 130, payment processing networks 150, issuers 160, and/or other entities the ability to continue to track the use of the evolving token and provide benefits based, inter alia, on the frequency of use, the type and amount of the transactions, the benefits accrued, etc. Moreover, associating consumer information with a particular evolving token may facilitate a later change of the evolving token into a payment device by making it more convenient for a consumer to make such a change (because, for instance, he may need not enter in any additional information) and may also provide for the ability of an issuer to pre-approve such a consumer.

At step S411, the consumer may use the evolving token in a second transaction. The second transaction may be at the same merchant or at a different merchant than the first transaction. A similar process as that described with reference to S403 may again be repeated for the second transaction. Also, similar to step S404, an indication of the second transaction may be received by a computer apparatus at step S412, such as the server computer 154 connected to the payment processing network 150.

The second benefit that the consumer may receive at step S412 may be determined using the process described in more detail with reference to FIG. 3. In the second transaction, unlike the first transaction in which there may have been no previous transactions using the evolving token, the second benefit may be based, at least in-part, on the fact that the evolving token was used in both the first transaction and the second transaction. For instance, the merchant condition 214 may be that if the evolving token is used once (as in a first transaction), the consumer may get a 5% discount on the transaction cost. If the consumer uses the evolving token again at the same merchant, the merchant may provide a second benefit of a 10% discount on the cost of the transaction because the of the use of the evolving token in both transactions. A further example may be that a merchant may specify that if the evolving token is used in a second transaction, and that second transaction occurs within two months of the first transaction, the consumer gets an additional 5% discount on the total transaction cost, for a total of 15% (10% plus the additional 5%). This example is merely exemplary. A merchant or other entity may decide on an any condition and any benefit to provide to a consumer.

During, or subsequent to, the second transaction, at step S414 the consumer may request that the evolving token change into a payment device. For instance, if the consumer is conducting the transaction at a merchant location (such as at a supermarket), the consumer may receive an option to make a request to change the evolving token into a payment device at a POS terminal. In some embodiments, the consumer may send the request to a website in an e-commerce environment. This request may be sent and received at step S415 by a computer apparatus at the merchant (such as merchant computer apparatus 134), the payment processing network 150 (e.g. at the server computer 154), the issuer 160, and/or any other entity. If the consumer is approved by the issuer 160, then at steps S416 a payment account may be associated with the evolving token so that it may be used as both a benefit or reward accrual device and a payment device. An exemplary process for this change was described in more detail with reference to FIG. 3. In some embodiments, rather than the consumer requesting that the evolving token change into a payment device, the evolving token may automatically change into a payment device based on a merchant 130, issuer 160, or other entity condition, as shown in step S417. This may particularly be the case if an issuer 160 is providing all or part of the benefit to the consumer for use of the evolving token. The consumer may still need to be approved by the issuer 160, but this may be done based on prior information that is associated with the evolving token. An exemplary process for changing an evolving token into a payment device was described above, including with reference to FIG. 3.

At step S418, the consumer may use the evolving token in a third transaction. The third transaction may be at the same merchant as the first and second transaction, or at a different merchant. Moreover, the merchant in the third transaction may not be associated with the evolving token, however, the consumer may still use the evolving token as a payment device. Furthermore, the evolving token may also continue to provide the consumer with a benefit from the merchant, and in this way, may serve as both a payment device and a benefit or reward accrual device.

C. Merchant Registration

Figure 5:
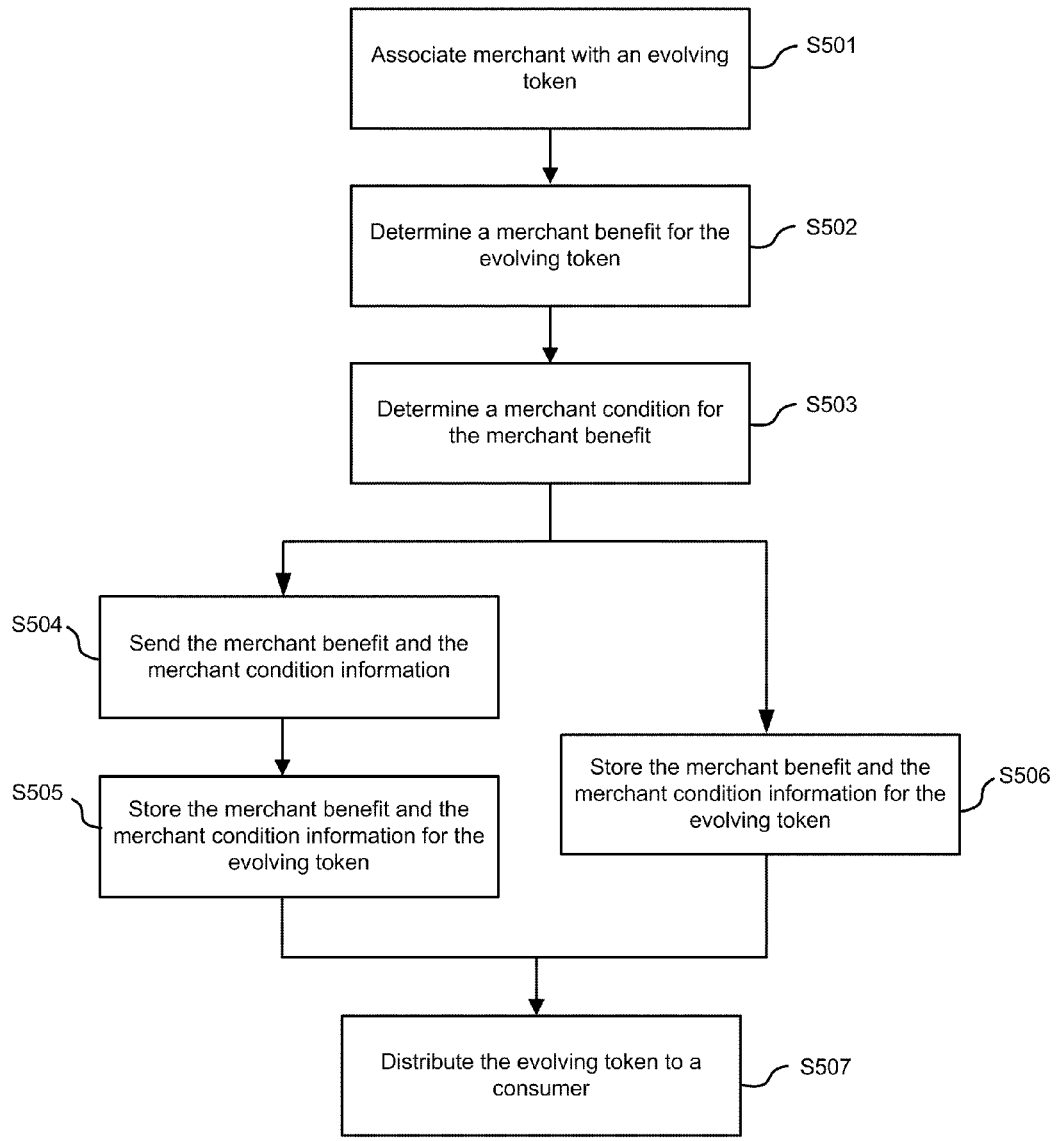
FIG. 5 shows a flowchart illustrating steps that may be involved in a registration process of an evolving token.

FIG. 5 illustrates an example of an exemplary process that describes a registration of a merchant for an evolving token in embodiments of the invention. With reference to FIG. 5, at step S501 a merchant 130 may be associated with an evolving token at a computer apparatus, such as server computer 154 and evolving token database 210 or merchant computer apparatus 134 and merchant database 136. As noted above, an evolving token may have a unique identifier 211, or a group of tokens may share a unique identifier. More than one merchant 130 may be associated with an evolving token, and not all merchants may be associated with each evolving token. Therefore, it may be beneficial to assign a merchant a unique identifier 212 that may be used to identify a merchant in a transaction and thereby link particular merchant benefits 213 and merchant conditions 214 for a specific evolving token. In some embodiments, an evolving token may be specific to a merchant (that is, it may only be used in a transaction with that merchant), and therefore it may not be necessary to associate a unique identifier with the merchant. In such embodiments, the evolving token itself may indicate that it is for use only with the particular merchant. During the registration process S501, a merchant may choose to be associated with an existing evolving token, to be associated with evolving tokens that are unique to only that merchant, to be associated with an evolving token that may not already exist but for which multiple merchants may be associated, or any other type of evolving token.

At step S502, the merchant may determine the benefits that the consumer may receive when using the evolving token during a transaction. For instance, the merchant may set the merchant benefit 213 so that the consumer receives a $5 discount on the cost of transactions. As noted above, other entities may also provide a benefit to the consumer for using the evolving token, such as the issuer 160. These other entities may also set benefits during a registration process. At step S503, the merchant may also set merchant conditions 214 for the evolving token. As described above, merchant conditions 214 may provide for the benefit received by the consumer for a transaction to change based on many factors, including previous transaction information and current transaction information. Again, any entity that provides a benefit may also set conditions for the evolving token.

At step S504, the merchant benefit 213 and merchant condition 214 information may be sent to server computer 154. In step S505, this information may be stored in payment processing database 152 (such as in evolving token database 210) so that this information is associated with an evolving token. In some embodiments, and as shown in step S506, the merchant benefit 213 and merchant condition 214 information may be stored locally at the merchant, for example at the merchant computer apparatus 134 and/or merchant database 136. As would be understood by one of ordinary skill in the art, this information may be stored in any suitable location on any suitable device, so long as during, or subsequent to, a transaction involving the evolving token, the information may be utilized so as to determine and provide a benefit to a consumer.

At step S507, the evolving token is distributed to the consumer. In embodiments where the evolving token is not initially associated with a consumer, this distribution may by done randomly. In some embodiments, if the evolving token is initially associated with a consumer, than the evolving token may need to be distributed to the specific consumer. The distribution of the evolving token may be performed by any party, including the merchant 130 and/or the issuer 160.

D. Merchant Participation

Figure 6:
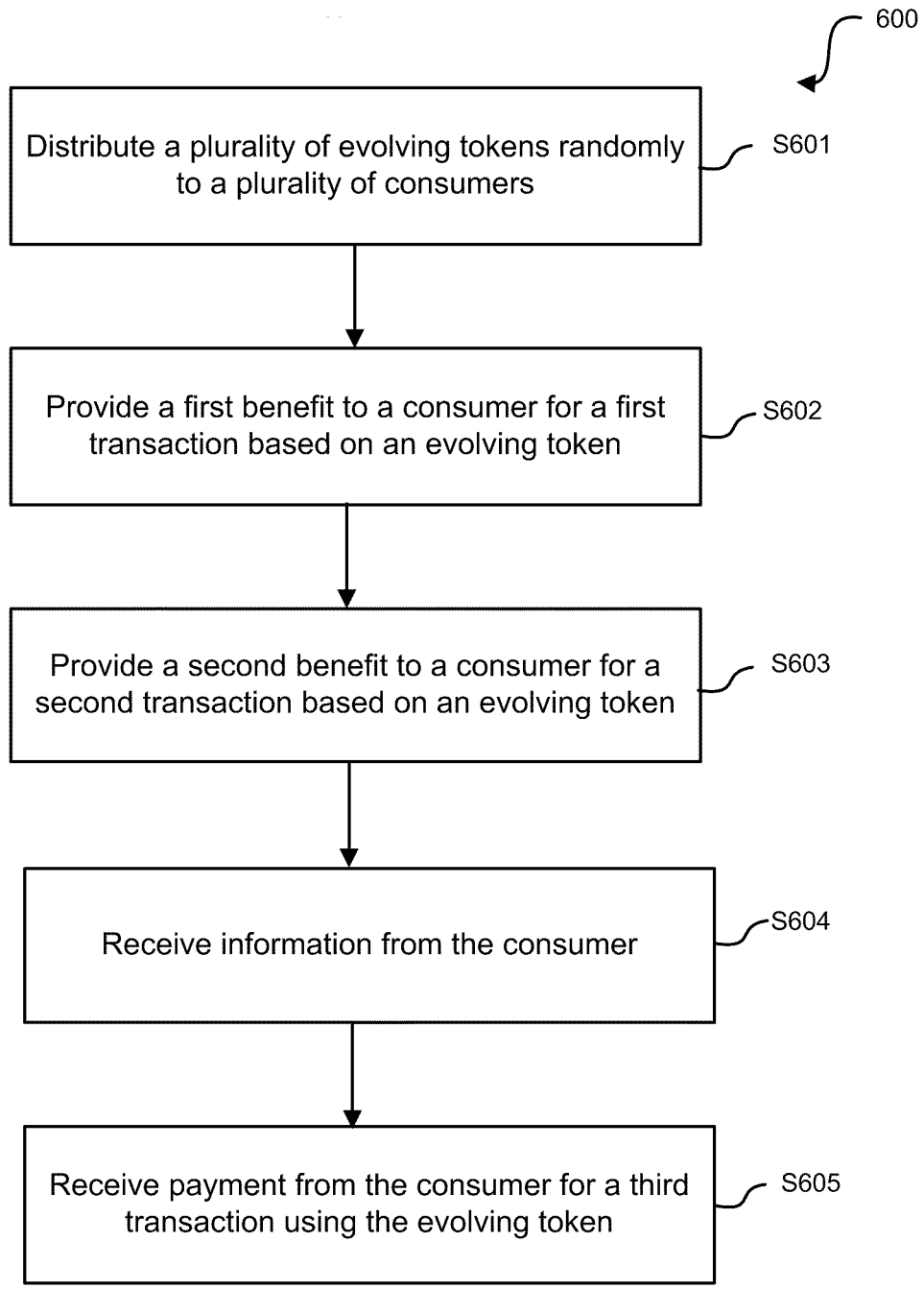
FIG. 6 shows a flowchart of the steps that may be involved in a process according to embodiments of the invention.

FIG. 6 illustrates an example of an exemplary process performed by a merchant for implementing an evolving token in embodiments of the invention. It should be understood that a merchant may perform more or less steps than those discussed with reference to FIG. 6 and that this is for illustration purposes only. With reference to FIG. 6, at step S601 the merchant may distribute a plurality of evolving tokens to a plurality of consumers. For instance, if the evolving tokens are not associated with a particular consumer, this distribution may be performed randomly such as in a mass advertising campaign or handed to consumers at a merchant location. As described above with reference to FIG. 5, the merchant may have registered the evolving token to define the benefit and condition information.

At step S602, the merchant provides a first benefit to a consumer that has presented or used the evolving token in a first transaction. The determination of the benefit may be performed at the merchant, such as by using merchant computer apparatus 134, or may determined remotely, such as at the server computer 154, and returned to the merchant. The merchant may apply the benefit immediately, such as a discount on the cost of the current transaction, or may provide the benefit subsequently, such as a rebate or a reward points system. At step S603, the merchant may provide a second benefit to the consumer in a second transaction where the user again presents or uses the evolving token. The benefit may be based, at least in-part, on the use of the evolving token in the first transaction. An example of a process for determining the benefit was discussed with reference to FIG. 3, and generally may be determined locally at the merchant or remotely and then communicated to the merchant.

At step S604, the merchant may receive information from the consumer. For instance, the merchant may request the consumer to provide consumer information such as a phone number of an address. The consumer may also provide this information as part of the transaction, such as when the consumer provides a payment device such as a credit card in the same transaction as when he uses the evolving token. The merchant may store this information locally, for instance in merchant database 136, or may send this information to a remote location, such as to server computer 154. The consumer information and transaction information may be associated with the evolving token.

At step S605, the merchant may receive payment from the consumer for a third transaction using only the evolving token. For instance, sometime between the second and the third transaction, the evolving token may become a payment device. An exemplary process for this was discussed above with reference to FIGS. 3 and 4. The evolving token may be associated with a payment account and thereby may be used to pay for a transaction at this, or perhaps other merchants as well. The merchant may still provide a benefit to the consumer for the current transaction based on the merchant benefit 213 and/or merchant condition 214 information previously stored and associated with the evolving token. In some embodiments, using the evolving token as a payment device may be another factor that can be considered in determining the benefit for the consumer.

Embodiments of the systems and methods described herein may provide a number of advantages, many of which have been discussed above. For instance, in some embodiments by initially not associating an evolving token with a particular consumer, the evolving tokens may be randomly distributed to consumers, which can reduce the cost of any such distribution. Moreover, the distributor (e.g. a merchant) does not need any information about the consumer in advance. Furthermore, a consumer may be more likely to use the evolving token at the outset if he is not required to provide any personal information to activate the device. Embodiments may also provide the advantage to the merchant of developing consumer loyalty by setting conditions that vary the benefit a consumer may receive based on the frequency of transactions (or other transaction related data). For example, the consumer may be informed in advance that if he uses the evolving token in a subsequent transaction (perhaps within a limited time frame), he will receive a greater benefit in the second transaction than in the first transaction. This creates an incentive for the consumer to return to this particular merchant.

Embodiments may also provide for data to be associated with the evolving token, either automatically through use of the evolving token or by consumer input, which can provide valuable information about the consumer and about the transactions. Moreover, it may increase the likelihood that a consumer will choose to change the evolving token into a payment account because it reduces the volume of information that he may need to provide. Furthermore, collecting and associating information with the consumer may permit an issuer to pre-approve the consumer for a payment account, thereby facilitating a faster change in the payment device. Embodiments may also provide the consumer with the advantage of needing only a single evolving token in a transaction to both receive a benefit and as a payment device.

Figure 7:
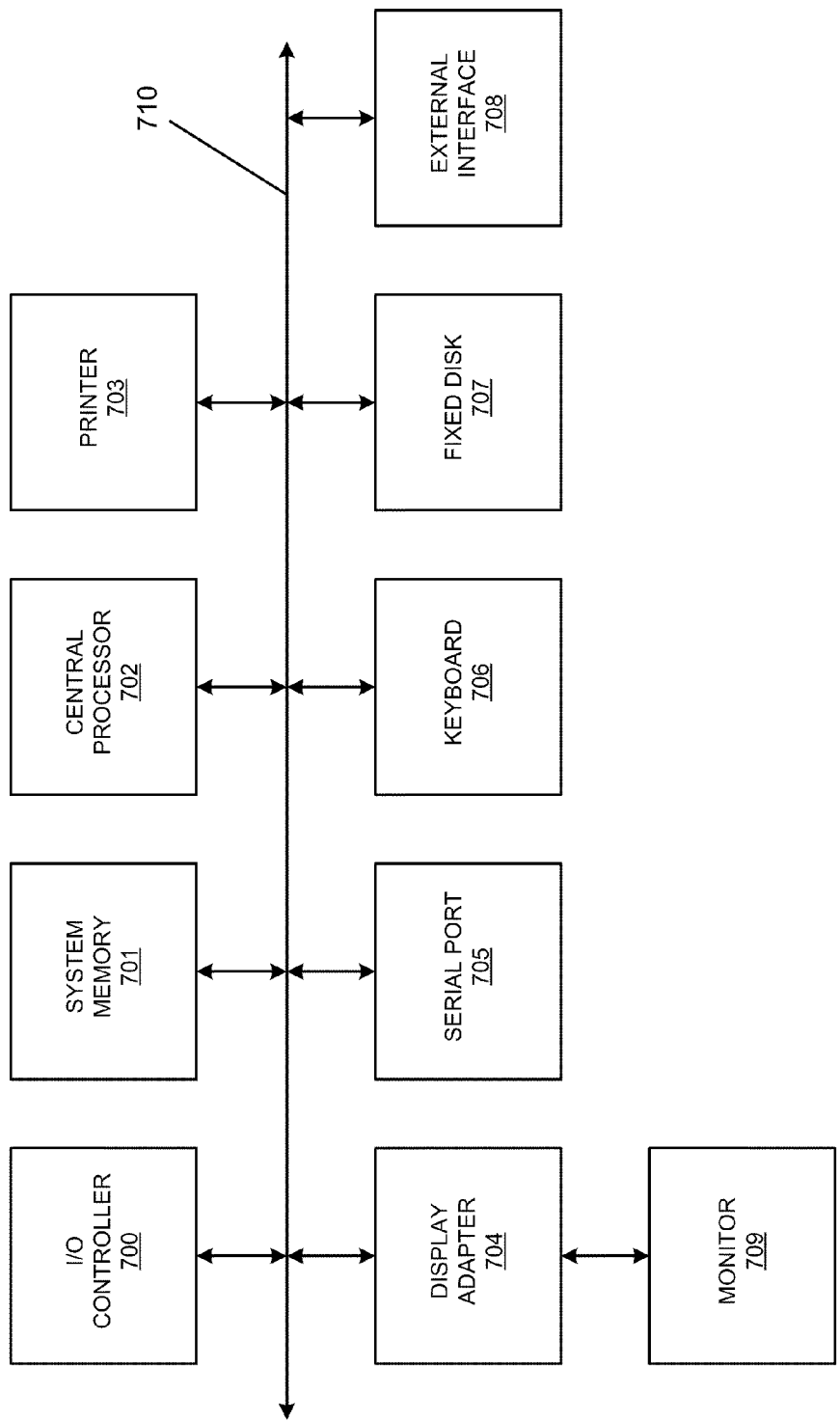
FIG. 7 shows a block diagram of components of a computer apparatus.

Referring now to FIG. 7 the various participants and elements (e.g., the issuer 160, the payment processing network 150, the server computer 154, the merchant 130, the acquirer 140, and the merchant computer apparatus 136) in FIGS. 1 and 2 can operate one or more computer apparatuses (e.g., a server computer) to facilitate the functions described herein. Any of the elements in FIGS. 1 and 2 can use any suitable number of subsystems to facilitate the functions described herein. Examples of such subsystems or components are shown in FIG. 7. The subsystems shown in FIG. 7 are interconnected via a system bus 710. Additional subsystems such as a printer 703, keyboard 706, fixed disk 707 (or other memory comprising computer readable media), monitor 709, which is coupled to display adapter 704, and others are shown. Peripherals and input/output (I/O) devices, which coupled to I/O controller 700, can be connected to the computer system by any number of means known in the art, such as serial port 705. For example, serial port 705 or external interface 708 can be used to connect the computer apparatus to a wide area network such as the Internet, a mouse input device, or a scanner. The interconnection via system bus allows the central processor 702 to communicate with each subsystem and to control the execution of instructions from system memory 701 or the fixed disk 707, as well as the exchange of information between subsystems. The system memory 701 and/or the fixed disk 707 can embody a computer readable medium.

Figure 8A:
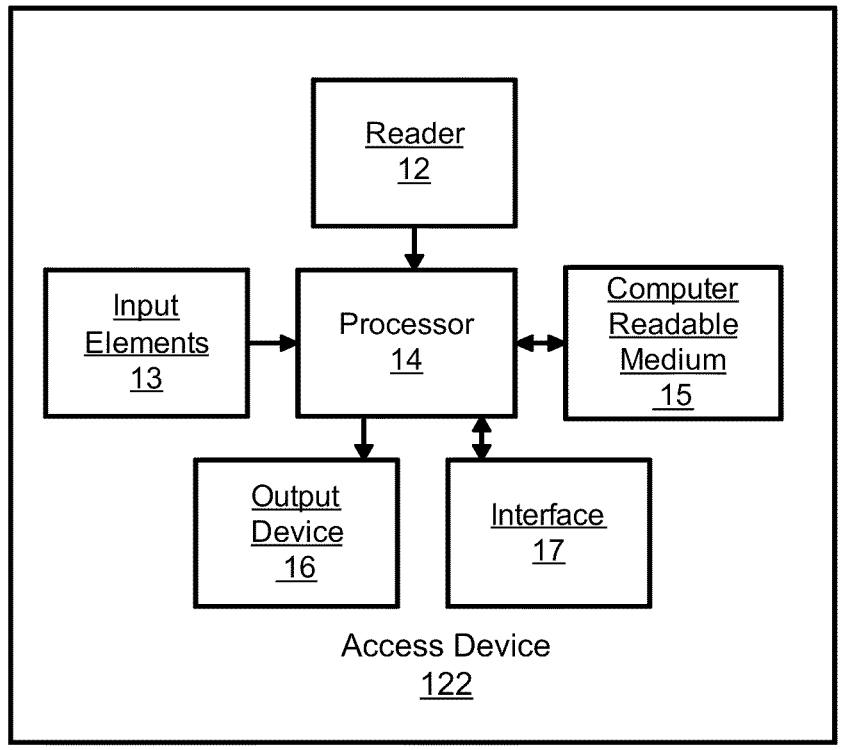
FIGS. 8(a) and (b) show block diagrams of an access device and an exemplary evolving token.

Referring now to FIG. 8(a), a block diagram of access device 122, which can be a scanner, is illustrated according to an embodiment of the invention. Access device can be utilized interchangeably with access device or terminal, point of sale (POS) device or terminal, and/or reader and terminal within the present disclosure. The access device 122 comprises a processor 14 operatively coupled to a computer readable medium 15 (e.g., one or more memory chips, etc.), input elements 13 such as buttons or the like, one or more readers 12 (e.g., a barcode reader, optical scanner, etc.), an output device 16 (e.g., a display, a speaker, etc.) and an interface 17. A housing can contain one or more of these components. The computer readable medium 15 can comprise instructions or code, executable by a processor. The interface 17 can be a wired or wireless interface capable of communication with the merchant register. In another embodiment, interface 17 can be a network interface for direct communication with acquirer 140, payment processing network 150, server computer 154, merchant computer apparatus 134, or any other device.

Figure 8B:
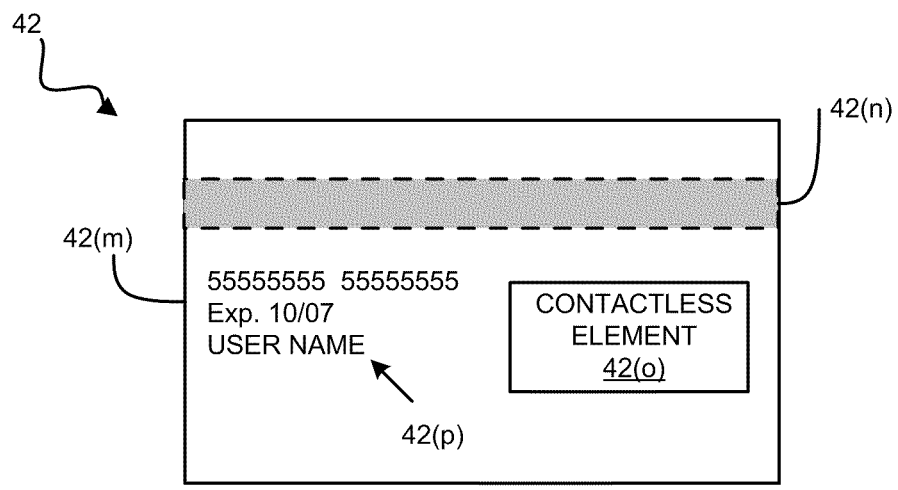

With reference to FIG. 8(b), an example of an evolving token in the form of a card 42 is shown. FIG. 8(b) shows a plastic substrate 42(m). A contactless element 42(o) for interfacing with an access device such as a point of sale terminal may be present on or embedded within the plastic substrate 42(m). Consumer information 42(p) such as an account number, expiration date, and consumer name may be printed or embossed on the card. Also, a magnetic stripe 42(n) may be on the plastic substrate 42(m).

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, can be implemented as software code to be executed by a processor using any suitable computer language such as, for example, Java, C++ or Perl using, for example, conventional or object-oriented techniques. The software code can be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium can reside on or within a single computational apparatus, and can be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment can be combined with one or more features of any other embodiment without departing from the scope of the invention.

A recitation of "a", "an" or "the" is intended to mean "one or more" unless specifically indicated to the contrary

What is claimed is:

1. A computer implemented method of using an evolving token, the method comprising:
   receiving a first indication by a computer apparatus that the evolving token has been used by the consumer as a non-payment device in a first transaction;
   receiving an indication that the evolving token is to be used as a payment device;
   in a subsequent transaction after the first transaction, converting, by the computer apparatus, the evolving token into the payment device based on the indication so that the evolving token can be used as the payment device,
   wherein converting the evolving token into the payment device comprises associating the evolving token with a payment account so that the evolving token can be used in payment transactions;
   receiving another indication at the computer apparatus that the evolving token has been used by the consumer in a payment transaction; and
   associating, by the computer apparatus, the consumer with the evolving token after receiving the first indication by the computer apparatus.

2. The method of claim 1 wherein the evolving token provides a benefit to the consumer in the first transaction.

3. The method of claim 1 further comprising:
   associating an image of the consumer with the evolving token.

4. The method of claim 1 further comprising associating consumer information of the consumer with the evolving token.

5. The method of claim 4 wherein the consumer information includes at least one of a consumer name, a credit card number, a checking account number, a savings account number, a social security number, a passport identification number, a drivers license number, an address, and an age.

6. The method of claim 4 wherein evolving token is provided to the consumer.

7. A computer apparatus, comprising a processor, and a computer readable medium comprising code, executable by the processor to implement a method comprising:
   receiving a first indication by the computer apparatus that the evolving token has been used by the consumer as a non-payment device in a first transaction;
   receiving an indication that the evolving token is to be used as a payment device;
   in a subsequent transaction after the first transaction, converting, by the computer apparatus, the evolving token into the payment device based on the indication so that the evolving token can be used as the payment device,
   wherein converting the evolving token into the payment device comprises associating the evolving token with a payment account so that the evolving token can be used in payment transactions;
   receiving another indication at the computer apparatus that the evolving token has been used by the consumer in a payment transaction; and
   associating, by the computer apparatus, the consumer with the evolving token after receiving the first indication by the computer apparatus.

8. The computer apparatus of claim 7 wherein the evolving token provides a benefit to the consumer in the first transaction.

9. The computer apparatus of claim 7 wherein the method further comprises:
   associating an image of the consumer with the evolving token.

10. The computer apparatus of claim 7 wherein the method further comprises associating consumer information of the consumer with the evolving token.

11. The computer apparatus of claim 10 wherein the consumer information includes at least one of a consumer name, a credit card number, a checking account number, a savings account number, a social security number, a passport identification number, a drivers license number, an address, and an age.

* * * * *